United States Patent [19]

Rudibaugh et al.

[11] Patent Number: 5,490,464
[45] Date of Patent: Feb. 13, 1996

[54] PLUG ASSEMBLIES AND METHODS FOR PLUGGING HOLES IN RAILROAD AUTORACK CARS

[75] Inventors: John W. Rudibaugh, West Chester; Charles L. Van Auken, Dillsburg, both of Pa.

[73] Assignee: Pennsy Corporation, West Chester, Pa.

[21] Appl. No.: 210,357

[22] Filed: Mar. 18, 1994

[51] Int. Cl.⁶ .................................................. B61D 17/00
[52] U.S. Cl. ........................... 105/422; 105/355; 105/404
[58] Field of Search ..................... 296/1.1, 208; 220/1.5, 220/233, 241, 242; 105/422, 355, 238.1, 370, 371, 372, 375, 396, 404, 406.1, 409, 423

[56] References Cited

U.S. PATENT DOCUMENTS

| | | | |
|---|---|---|---|
| 2,501,722 | 3/1950 | Hammerly et al. | 220/241 |
| 2,605,924 | 8/1952 | Green | 220/233 |
| 3,606,446 | 9/1971 | Leslie | 296/208 |
| 3,646,314 | 2/1972 | Windsor | 220/233 |
| 3,701,560 | 10/1972 | Emmerson | 296/208 |
| 4,146,877 | 12/1979 | Schulz et al. | 296/208 |
| 4,198,042 | 4/1980 | Olson | 105/422 |
| 4,518,196 | 5/1985 | Forster et al. | 296/208 |
| 4,676,391 | 6/1987 | Peterson | 220/233 |
| 4,833,771 | 5/1989 | Dunwoodie | 220/1.5 |

FOREIGN PATENT DOCUMENTS 3836018  4/1990  Germany ............................. 296/208

*Primary Examiner*—Mark T. Le
*Attorney, Agent, or Firm*—John F. A. Earley; John F. A. Earley, III

[57] ABSTRACT

A deck double plug assembly for plugging first inboard and second outboard deck holes in the deck of converted railroad autorack cars comprises a first plug connected to a second plug base assembly by a connector portion. The second outboard plug assembly is clamped to the deck to cover and plug the second outboard deck hole, whereby the deck plug assembly may be installed by one person. The method of installation from the top surface of the deck includes the steps of loosely assembling the second outboard plug assembly, holding the second deck plug assembly and pushing the first plug downwardly through the second outboard deck hole, inserting the first inboard plug into the first deck hole from underneath the deck, and clamping the second plug assembly to the deck surrounding the second deck hole.

9 Claims, 5 Drawing Sheets

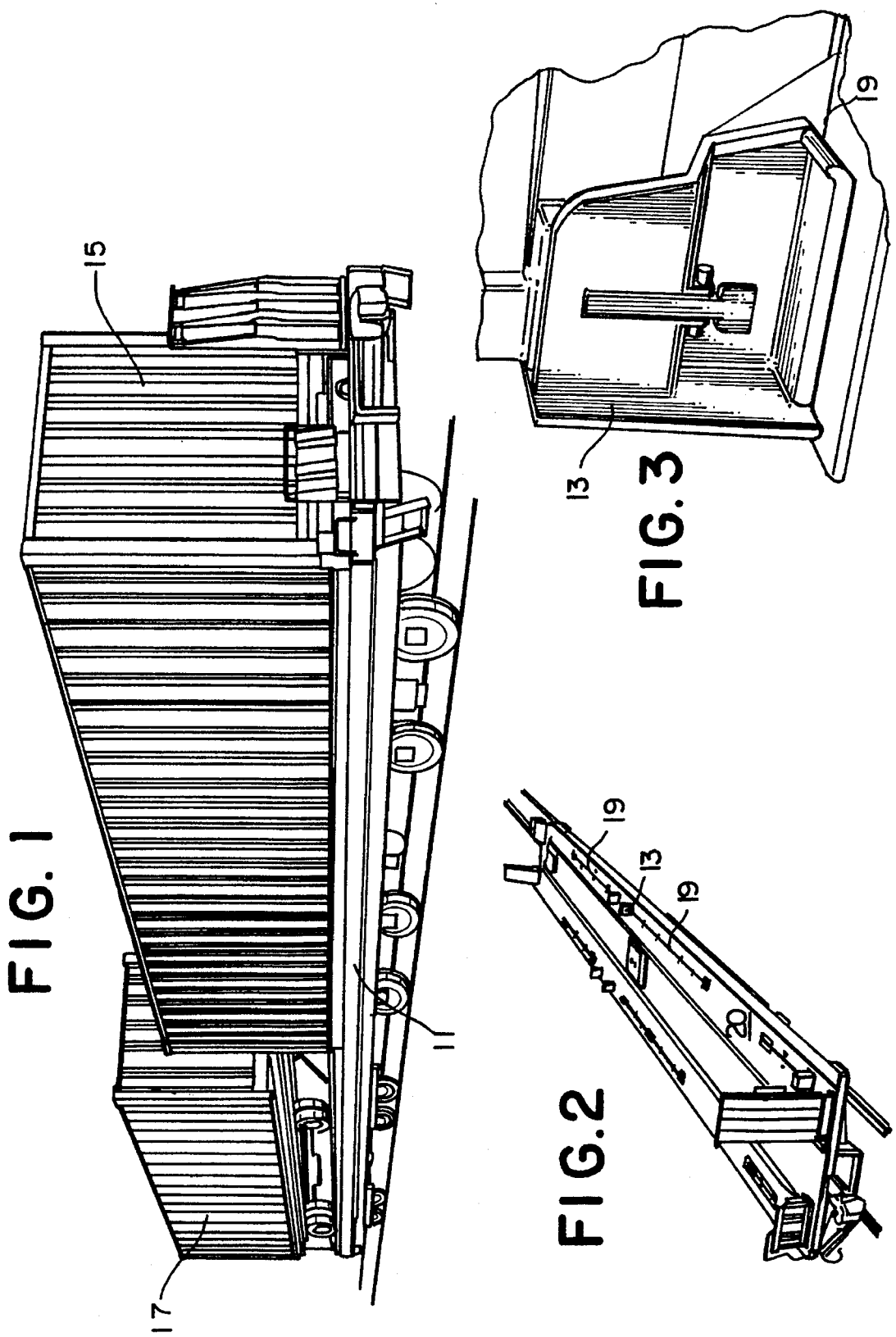

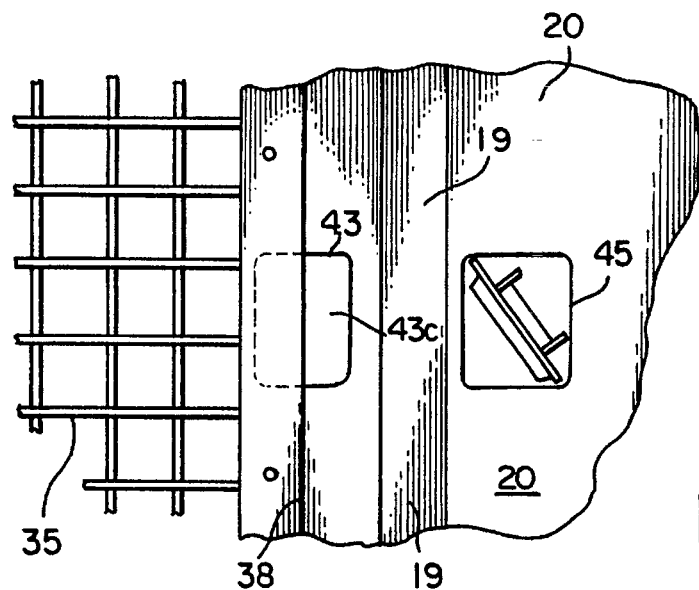
FIG. 8
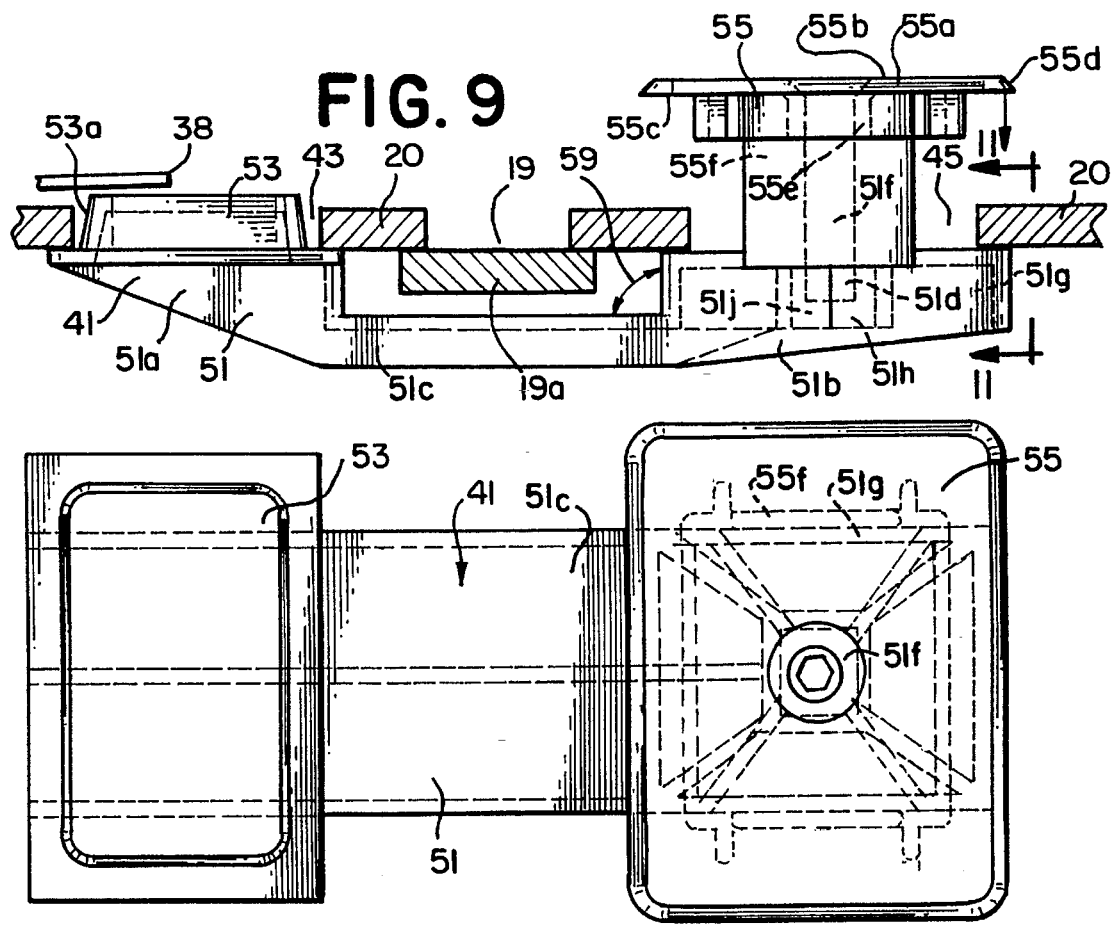
FIG. 9
FIG. 10

5,490,464

PLUG ASSEMBLIES AND METHODS FOR PLUGGING HOLES IN RAILROAD AUTORACK CARS

BACKGROUND OF THE INVENTION

1. Field of the Invention

The present invention relates to railroad autorack cars for carrying automotive vehicles, and more particularly concerns plug assemblies for covering holes in the deck of modified railroad autorack cars to thereby prevent wind turbulence within the railroad autorack cars that causes a sand blast effect on the paint finish of the automobiles in the cars, with the dust and dirt within the cars impinging against and damaging the paint finish of the automobiles.

This invention also concerns a method of installing the inventive plug assemblies into deck holes by one person and from inside the autorack car.

2. Description of the Prior Art

Railroad companys from time to time modify intermodal cars 11, i.e., flat bed railroad cars, for use as autorack cars which are used for transporting new automotive vehicles such as automobiles, trucks and vans from manufacturer to the automotive dealers. Intermodal cars 11 are equipped with container mounts or chocks 13 that lock containers 15 or trailer trucks 17 in place on the car 11 (FIGS. 1–3). These container mounts 13 are moveable in longitudinal slots 19 in the deck 20 of the cars 11 to suit different length containers. The mounts 13 are slidable within the slots 19 and are locked into deck holes at set locations.

A railroad intermodal car 11 is modified to become an autorack car 23 by providing additional decks, sides 25, and a roof 27, as well as adding end closures 29, to the flat deck 20 of the intermodal railroad car 11.

However, automobile companys are complaining that the deck holes of these converted autorack cars 23 create a wind turbulence within the railroad car, and this wind turbulence creates a mini sand blast effect on the paint finish of the automobiles contained within the autorack car, with the dust and dirt inside the autorack car impinging on and damaging the finish of the automobiles.

Accordingly, the railroad industry is looking for a means of covering these deck holes in the converted autorack cars 23 to prevent the wind and dirt from damaging the paint and finish of the automobiles. A plug may solve the problem. However, the plug design must be such that the plug may be installed by only one person, and may be easily installed from the top of the deck for the safety of the installer so that the installer does not have to crawl beneath the railroad car.

It is further required that the plug does not extend far above the deck surface so as to avoid introducing a tripping hazard for the people loading automobiles into the autorack car 23. Also, moisture and snow may collect on the deck of the autorack car 23 and must be removed, so the plug must withstand the means of snow removal.

A further problem that prevents covering deck holes easily is a new automobile chock apparatus for holding truck trailers in place on a railroad car, such as that obtainable from IEC-HOLDEN, INC., Montreal, Quebec, H4T 1G8, Canada, which is shown in FIGS. 5 and 6. This chock apparatus includes a pair of deck grates 33 and 35 that are mounted one on each side of the deck 20 and include a hinge 37, 38 which is located near the side wall 25 of the autorack car 23. These grates 33 and 35 partly cover one of the deck holes 43 and leave various widths of the deck hole open. Covering a deck hole 43 which is partly covered by a grate 35 is difficult because the uncovered portions, such as uncovered portion 43c of deck hole 43, are not the same size, and depends on how much of the deck hole is covered by the grate.

SUMMARY OF THE INVENTION

Accordingly, it is an object of this invention to overcome the problems of the prior art and to provide a two piece polymer double plug apparatus for plugging two deck holes that is installed from the top of the deck even though one of the deck holes may be partly covered by a deck grate.

It is also an object to provide a single plug apparatus for covering a single deck hole.

Another object is to provide a method of installing the plugs by the installer from the top of the deck so that the installer does not have to go underneath the railroad car to install the plugs.

It is another object to prevent rusting of the plugs.

The double plug apparatus of this invention comprises a bottom plug base which includes a first bottom plug base portion connected to a second bottom plug base portion by a connector portion. A first plug is integrally mounted on the first bottom plug base portion, and a second plug cover plate is separate from the second bottom plug base portion but is connectable to the second bottom plug base portion by a bolt and nut.

To plug two holes in the deck, a first inboard deck hole partly covered by a grate and a second outboard deck hole, the first bottom plug base portion of the double plug apparatus is passed in cattycorner fashion through the uncovered outboard deck hole from the top of the deck. The double deck plug apparatus is then rotated so that the first inboard plug swings into position in the partly covered inboard deck hole from the bottom of the inboard deck hole so as to plug the inboard deck hole. Then the outboard deck hole is covered by fastening the second plug cover plate to the second bottom plug base portion.

Since the partly covered inboard deck hole is plugged by inserting first inboard deck plug into the inboard hole from the bottom, the location of the deck grates 33, 35, and their hinges 37, 38 are of no consequence.

To plug a single uncovered hole the single plug assembly has its base portion inserted into the deck hole and positioned beneath the deck hole, and its top cover plug placed over the hole and held to the base portion by a nut and bolt.

BRIEF DESCRIPTION OF THE DRAWINGS

FIG. 1 is a view in perspective of an intermodal car with a truck trailer and a container in position on the car;

FIG. 2 is a partial view in perspective of the interior deck of the intermodal car showing a deck slot and a chock installed in the slot;

FIG. 3 is an enlarged view in perspective of a container mount;

FIG. 8 is a partial view in top plan showing an inboard deck hole partially covered by a hinged grate, and showing the deck double plug apparatus being inserted cattycorner through an outboard deck hole after which it is rotated to a horizontal position so as to insert the first plug into the inboard deck hole, and then the second plug is clamped onto the top of the outboard deck hole;

FIG. 9 is a view in side elevation of the deck double plug apparatus constructed in accordance with the invention as it is being assembled into the deck holes;

FIG. 10 is view in top plan of the deck double plug apparatus of FIG. 9;

DETAILED DESCRIPTION OF THE DRAWINGS

Figure 4:
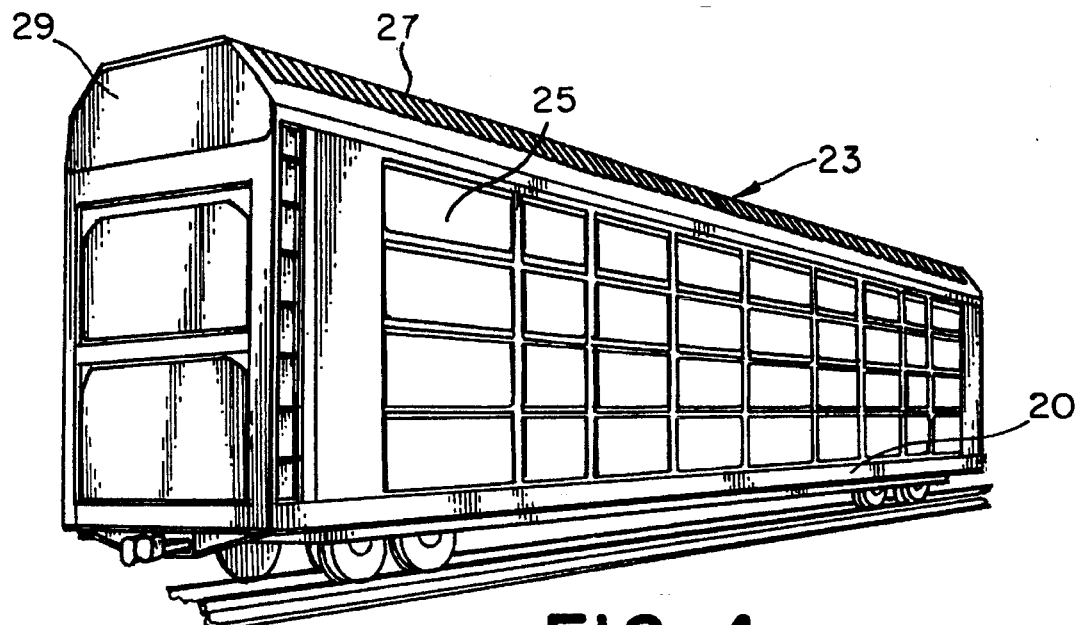
FIG. 4 is a view in perspective of an autorack railroad car.
Figure 5:
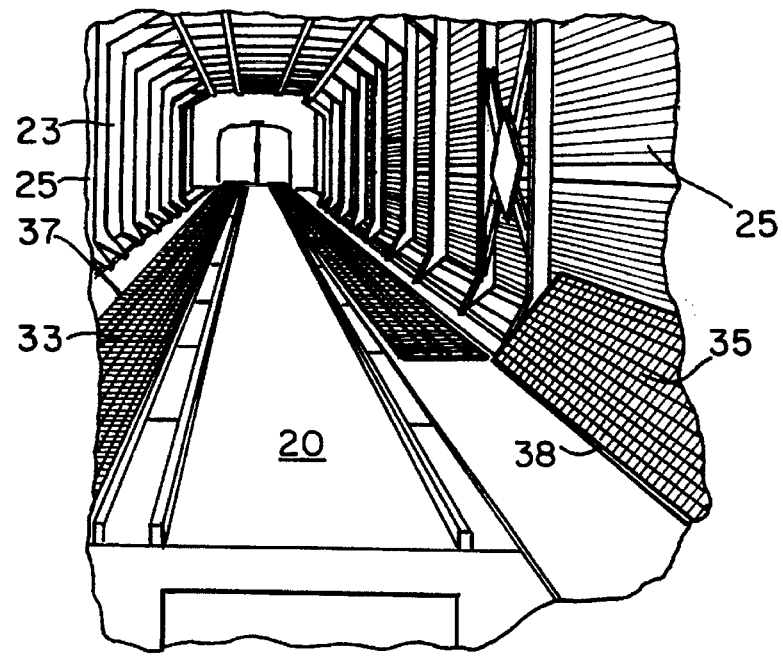
FIG. 5 is a view in perspective of the interior of a modified autorack car including hinge grates which partly cover the inboard deck holes of the car.
Figure 6:
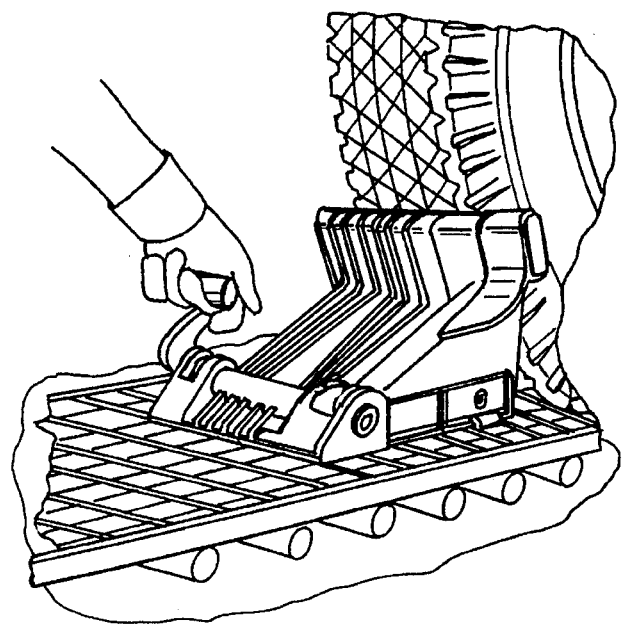
FIG. 6 is a perspective view of a chock installed behind a wheel of a truck trailer and locked into position on one of the grates of FIG. 5.
Figure 7:
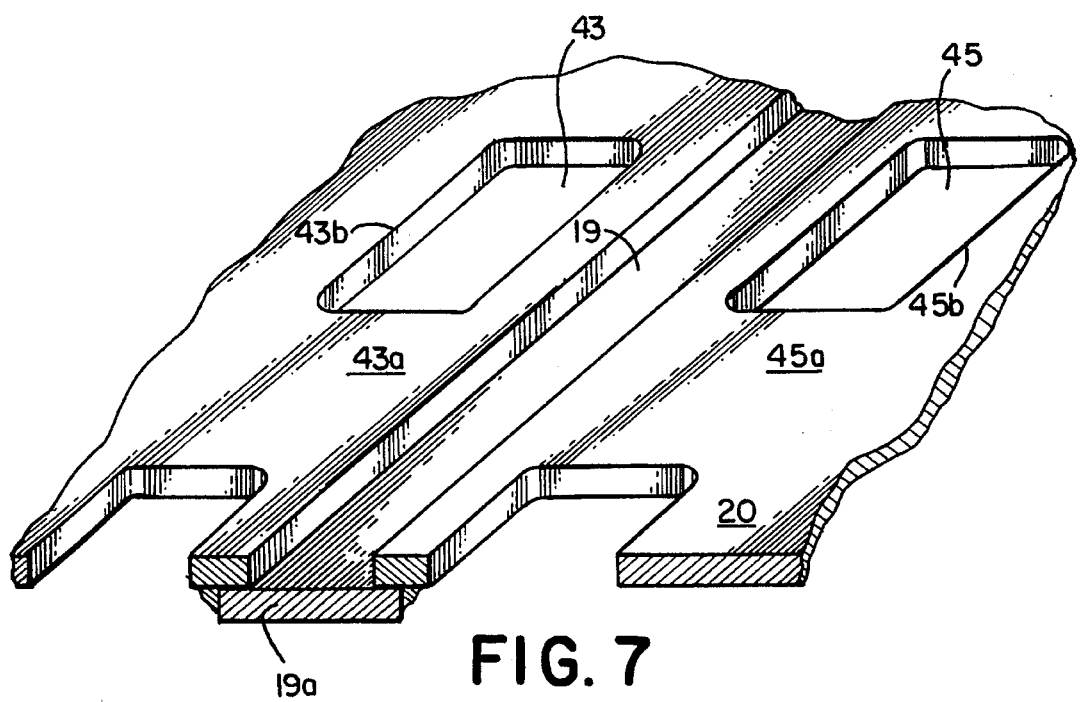
FIG. 7 is an enlarged partial view in perspective showing an inboard deck hole and an outboard deck hole separated by a slot in the deck of the railroad car.
Figure 12:
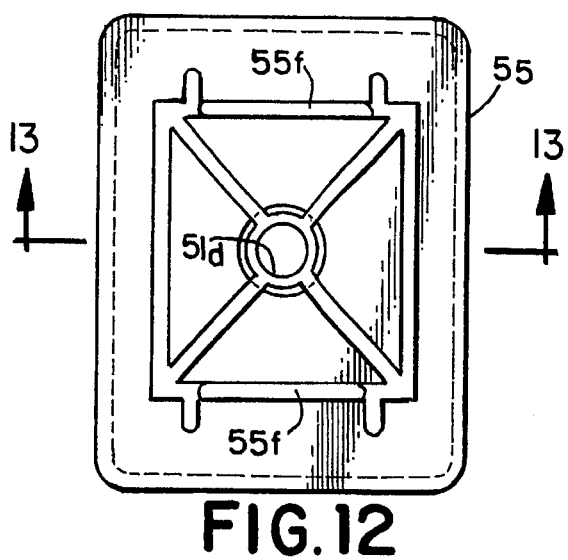
FIG. 12 is a view in bottom plan of a detached second plug.
Figure 14:
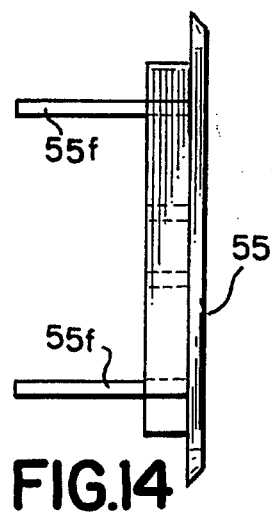
FIG. 14 is a view in side elevation of the second plug of FIG. 12.
Figure 13:
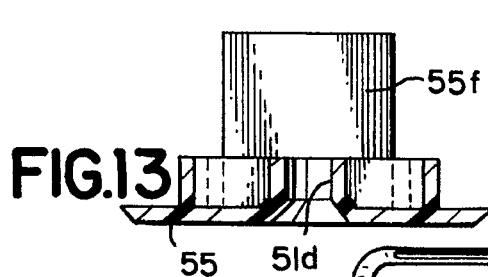
FIG. 13 is a view in verticle section of the second plug of FIG. 12.
Figure 11:
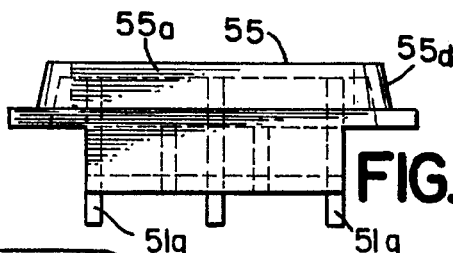
FIG. 11 is a view in end elevation of the double plug apparatus.

Turning now to the drawings, there is shown a double plug assembly or apparatus 41 for covering a first inboard deck hole 43 and a second outboard deck hole 45 in the deck 20 of an intermodal railroad car which has been converted to a modified autorack railroad car 23. Deck 20 has a slot 19 with a stiffener bar 19a welded across the slot underneath the deck. The double plug apparatus 41 comprises a plug base 51 having a first inboard plug base portion 51a connected to a second outboard plug base portion 51b by a connector base portion 51c. The second outboard plug base portion 51b is provided with a bolt opening 51d in its center portion for receiving a bolt 51f. Second outboard plug base 51b portion also has depending side walls 51g which are parallel to each other.

A nut recess 51h is formed in the bottom portion of the second outboard plug base 51b and has confining walls for receiving a nut 51j and preventing the nut from turning.

A first inboard plug 53 is integrally mounted on and extends upwardly from the first inboard plug base portion 51a and is adapted to be installed into a first inboard deck hole 43 from beneath the deck 20. Plug 53 has beveled side edges 53a for easier insertion of plug 53 into first inboard deck hole 43 from below.

A detached second plug 55 has an upper cover or plate 55a that is wider and longer than the outboard deck hole 45 and is provided with an upper surface 55b and a lower surface 55c, and with beveled side edge portions 55d. Plug 55 also is provided with a hole 55e in its center portion for receiving bolt 51f and holding the head of the bolt 51f and passing the stem of the bolt 51f through the bolt hole 55e and attaching the bolt 51f to a nut 51j in the nut recess 51h. The top portion of hole 55d is recessed to receive the head of the bolt 51f so that the bolt head does not stick up above the plug 55.

A pair of parallel spaced-apart flanges 55f depend downwardly from the lower surface 55c of the upper plate 55a and straddle the side walls 51g of the second plug base portion 51b to prevent the upper plate 55a from turning, especially when the bolt 51f is being tightened.

The deck area around deck holes 43, 45 has a top surface 43a, 45a and edge portions 43b, 45b. The upper plate 55a of second plug 55 is wider and longer than the second deck hole 45 so that the edge portions of the lower surface 55c of plate 55 are adapted to rest on the top edge portions of the top surface of the second outboard deck hole 45 when the upper plate 55a is clamped in position.

The deck double plug assembly 41 may be installed by one person, and may be installed from the top surface of the deck 20.

The method of attaching double plug assembly 41 and plugging the deck holes 43 and 45 includes the steps of attaching the second plate plug or cover 55 loosely to the second plug base portion 51b with a nut 51j positioned in the nut recess 51h and a bolt 51f inserted partway into the nut 51j. Then, holding the double plug assembly 41 by the second plug base portion 51b, the double plug assembly 41 is inserted cattycorner downwardly through the second outboard hole 45 as is shown in FIG. 8. Then the plug base 51 is rotated and the first inboard plug 53 is inserted into the first inboard deck hole 43 from underneath the deck 20. The bolt 51f is tightened to hold the first inboard plug 53 in the first inboard deck hole 43 to close the first inboard deck hole 43, and to hold the second plug 55 over the second outboard deck hole 45 to close the second outboard deck hole 45.

First inboard plug 53 is beveled to allow for easier insertion into the first deck hole 43 from below.

Stiffener bar 19a is attached below slot 19, and connector portion 51c of plug base 51 is offset so as to fit below and span the stiffener bar 19a.

First plug base portion 51a is cantilevered from second plug base portion 51b and the angle 59 of the cantilever is less than 90° to thereby create an interference contact between first inboard plug 53 and first inboard deck hole 43 to create a good fit. The present cantilever is 88½° although the angle may be changed to 87° for more preload. Initially this creates a condition where the top bearing surface of the first inboard plug 53 is higher than second plug 55. This insures a tight fit should the deck surface vary in height.

The deck double plug assembly 41 is clamped in place by drawing the second plug 55 tight by turning the bolt 51f into nut 51j.

The two downwardly extending flanges 55f from second outboard plug 55 engage the depending side walls 51g of second plug base portion 51b to prevent rotation between second plug 55 and second plug base portion 51b during the clamping operation. This precludes the need for having someone hold the plug base 51 during clamping.

Figure 16:
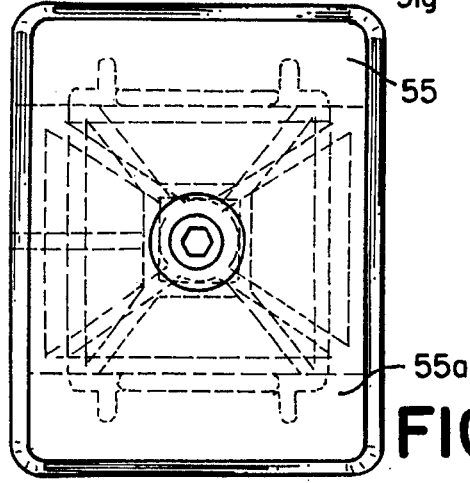
FIG. 16 is a view in top plan of the single plug of FIG. 15.
Figure 15:
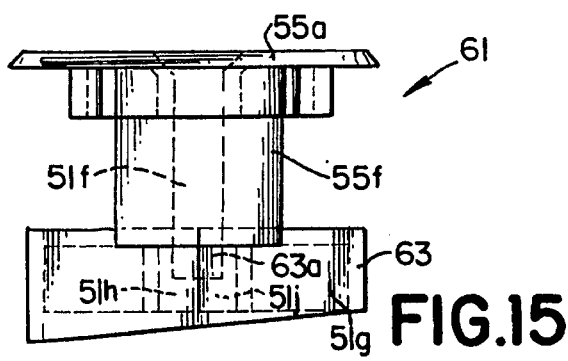
FIG. 15 is a view in side elevation of a single plug constructed in accordance with the invention.

Turning now to the single plug embodiment of the invention illustrated in FIGS. 15 and 16, there is shown a deck hole single plug 61 for plugging single holes in the decks of a railroad autorack cars. The single plug 61 is made from the same forming dies as the double plug 41 except that the first inboard plug base portion 51a and the connector portion 51c are blocked off in the die so that only the second outboard base portion is made in the die and becomes a single plug base 63. The second plug or cover 55 remains the same as in the double plug 41. Accordingly, the single plug 61 is a sub-combination of the double plug 41.

The deck hole single plug 61 for plugging holes in the decks of railroad autorack cars comprises a plug base 63 having a bolt opening 63a in its center portion for receiving a bolt 51f. A nut recess means 51h is formed in the plug base portion 63 for receiving a nut 51j and preventing it from turning.

Separate plug cover plate 55a is provided for covering a deck hole, and bolt and nut means 51f, 51j are provided for connecting the plug cover plate 55a to the plug base 63 for clamping the plug cover plate 55a over the deck hole and closing the deck hole.

Rotation preventing means are provided on the plug cover plate 55a and on the plug base 63 for preventing the plug cover plate 55a from turning in relation to the plug base 63.

The rotation preventing means for preventing the plug cover plate 55a from turning in relation to the plug base 63 comprises a pair of spaced-apart flanges 55f which depend from the plug plate cover 55a, and a pair of sidewalls 51g which are formed on the plug base 63 so that the turning of the cover plate 55a is prevented by the cover plate flanges 55f contacting the plug base sidewalls 51g.

We claim:

1. A double plug assembly plugging deck holes in a deck of a railroad autorack car, comprising:

a first plug means for plugging a first of said deck holes from the bottom of the deck, said first plug means having a plug which is inserted in the first deck hole from below the deck, a second plug assembly means for plugging a second of said deck holes from the top of the deck, said second plug assembly means including a second plug and clamping means for clamping the second plug means to the deck, and connecting means for connecting the second plug assembly means to the first plug means and for holding the first plug means in place in the first deck hole.

2. The invention according to claim 1, said first plug means comprising a first plug base portion, and said plug of said first plug means integrally mounted and extending upwardly from the first plug base portion and installed into a first inboard deck hole from beneath the deck.

3. The invention according to claim 1, the second plug assembly means comprising a second plug base portion having a bolt opening in its center portion for receiving a bolt and having a nut recess means for receiving a nut and holding the nut from turning, and having depending side walls, said second plug having a cover plate with an upper surface and a lower surface with a hole in its center for receiving the bolt and passing the stem of the bolt through the bolt hole and attaching the bolt to the nut in the nut recess means, a pair of spaced-apart flanges depending downwardly from the lower surface of the cover plate for stradling the side walls of the second plug base portion for preventing the cover plate from turning, said deck holes having a top surface and edge portions, said cover plate of the second plug being wider and longer than the second deck hole so that the edge portions of the lower surface of the cover plate are adapted to rest on the edge portions of the top surface of the second deck hole.

4. The invention of claim 1, said first plug means including a first plug base portion, said second plug assembly means including a second plug base portion, said connecting means comprising an integral connector portion extending between the first plug base portion and the second plug base portion.

5. A double plug assembly for plugging holes in the deck of railroad autorack cars, comprising a plug base having a first plug base portion connected to a second plug base portion by a connector portion, the second plug base portion having a bolt opening in its center portion for receiving a bolt and having a nut recess for receiving a nut and having depending sidewalls, nut recess means in the bottom portion of the second plug base portion for receiving the nut and preventing the nut from turning, a first inboard plug integrally mounted on and extending upwardly from the first plug base portion and adapted to be installed into a first inboard deck hole from beneath the deck, a detached second outboard plug having an upper cover plate with an upper surface and a lower surface with a hole in its center for receiving the bolt and holding the head of the bolt and passing the stem of the bolt through the bolt hole and attaching the bolt to a nut in the nut recess, a pair of spaced-apart flanges depending downwardly from the lower surface of the upper plate for stradling the sidewalls of the second plug base portion for preventing the upper cover plate from turning, said deck holes having a top surface, and edge portions, said upper cover plate of the second plug being wider and longer than the second outboard deck hole so that the edge portions of the lower surface of the cover plate are adapted to rest on the edge portions of the top surface of the second outboard deck hole, whereby the deck plug assembly may be installed by one person, and may be installed from the top surface of the deck by attaching the second outboard plug loosely to the second plug base portion with a nut positioned in the nut recess and a bolt inserted partway into the nut, holding the deck plug assembly by the second plug base portion and inserting the first plug base portion downwardly through the second deck hole and inserting the first inboard plug into the first inboard deck hole from below, and tightening the bolt to hold the first plug in the first inboard deck hole to close the first inboard deck hole, and to hold the second plug over the second outboard deck hole to close the second outboard deck hole.

6. A method of plugging holes in the deck of railroad autorack cars (49) from the top of the deck, comprising providing a plug base having a first plug base portion connected to a second plug base portion by a connector portion, the second plug portion having a bolt opening in its center portion for receiving a bolt and having a nut recess for receiving a nut and having depending sidewalls, nut recess means in the bottom portion of the second plug base portion for receiving the nut and preventing the nut from turning, a first inboard plug integrally mounted on and extending upwardly from the first plug base portion and adapted to be installed into a first inboard deck hole from beneath the deck, a detached second outboard plug having an upper plate with an upper surface and a lower surface with a hole in its center for receiving the bolt and passing the stem of the bolt through the bolt hole and attaching the bolt to a nut in the nut recess, a pair of spaced-apart flanges depending downwardly from the lower surface of the upper plate for stradling the sidewalls of the second plug base portion for preventing the upper plate from turning, said deck holes having a top surface and edge portions, said upper plate of the second plug being wider and longer than the second outboard deck hole so that the edge portions of the lower surface of the plate are adapted to rest on the edge portions of the top surface of the second outboard deck hole, said method comprising the steps of:

attaching the second outboard plug loosely to the second plug base portion by positioning a nut in the nut recess, and inserting a bolt partway into the nut, holding the deck plug assembly by the second plug base portion and inserting the first plug base portion downwardly through the second deck hole, inserting the first plug into the first inboard deck hole from underneath the deck, and tightening the bolt to hold the first plug in the first inboard deck hole to close the first inboard deck hole and to hold the second plug to cover the second outboard deck hole to close the second outboard deck hole.

7. A double plug assembly plugging holes in a deck of a railroad autorack car, comprising:

a first plug means for plugging a first of said deck holes from the bottom of the deck, said first plug means including a first plug, a second plug assembly means for plugging a second of said deck holes from the top of the deck, connecting means connecting the first plug means to the second plug assembly means, said second plug assembly means including a second plug, said connecting means being located beneath the plugs, and said second plug assembly means including clamping means for clamping the second plug to the second deck hole and for holding the first plug in the first deck hole.

8. The invention of claim 7, said second plug assembly means also including a base member, and said clamping means includes a bolt extending through the second plug into a nut mounted in the base member.

9. The invention of claim 8, including means extending between the second plug and the base member for preventing the second plug from rotating around the bolt.

* * * * *